United States Patent
Kilström

[19]

[11] Patent Number: 5,950,274
[45] Date of Patent: Sep. 14, 1999

[54] SEPARATION DEVICE FOR A VACUUM CLEANER

[75] Inventor: Lars Kilström, Täby, Sweden

[73] Assignee: Aktiengesellschaft Electrolux, Stockholm, Sweden

[21] Appl. No.: 08/910,763

[22] Filed: Aug. 13, 1997

[30] Foreign Application Priority Data

Sep. 4, 1996 [SE] Sweden ................................. 9603212

[51] Int. Cl.$^6$ ....................................................... A47L 7/00
[52] U.S. Cl. ............................... 15/350; 15/353; 55/459.1
[58] Field of Search ..................... 15/350, 353; 55/459.1

[56] References Cited

U.S. PATENT DOCUMENTS

| | | | |
|---|---|---|---|
| 1,759,947 | 5/1930 | Lee | 15/353 X |
| 2,763,886 | 9/1956 | Brown et al. | 15/353 X |
| 2,874,801 | 2/1959 | Van Der Kolk | |
| 3,267,511 | 8/1966 | Meyerhoefer | 15/353 |
| 3,320,727 | 5/1967 | Farley et al. | |
| 4,566,149 | 1/1986 | Fitzwater | 15/353 X |
| 5,145,499 | 9/1992 | Dyson | 15/353 X |
| 5,350,432 | 9/1994 | Lee | |

FOREIGN PATENT DOCUMENTS 3722701  12/1988  Germany.

*Primary Examiner*—Chris K. Noore
*Attorney, Agent, or Firm*—Pearne, Gordon, McCoy & Granger LLP

[57] ABSTRACT

A vacuum cleaner having a separation device and a vacuum source communicating with a tube handle. The tube handle is connected to a nozzle by a tube shaft (33). The tube shaft is either shaped as a cyclone separator or a cyclone separator is arranged between the nozzle and the tube handle. The cyclone separator is provided with a whirl chamber (37) which is defined, in part, by an up-side-down truncated cone (41). The whirl chamber has an inlet opening (38), a first outlet opening and a second outlet opening. The inlet opening is placed at the upper part of the whirl chamber (37). Partially cleaned air flows through the first outlet opening (39) which communicates with the vacuum source. The second outlet opening (42) is placed at the lower part of the whirl chamber. The second outlet opening communicates with a dust collecting container (43).

12 Claims, 2 Drawing Sheets

SEPARATION DEVICE FOR A VACUUM CLEANER

BACKGROUND OF THE INVENTION

The present invention relates to a separation device for a vacuum cleaner having a vacuum source which, via a tube connection, communicates with a tube handle, and wherein the tube handle is connected to a nozzle by means of a tube shaft.

Vacuum cleaners of the type mentioned above, so-called canister vacuum cleaners, are previously known. These vacuum cleaners comprise a vacuum cleaner housing having a vacuum source, usually a fan unit, and a dust container or bag. The dust particles entrained in the air drawn through the nozzle flow through the tube shaft, the tube handle and the hose into the air-pervious dust bag in which the particles are collected before the filtered air flows further through the fan unit to atmosphere.

It is previously known to use separating devices for canister-type vacuum cleaners in order to separate larger dirt particles before they reach the dust container. Such a device is described in DE-A-2946572. This publication shows a canister-type vacuum cleaner in which the cyclone separator is placed directly on the vacuum cleaner housing. The outlet of the separator communicates with the dust container, whereas the vacuum cleaner hose is connected to the separator. However, the position of the separator has certain disadvantages since it increases the total height of the vacuum cleaner housing, which means that tensioning forces, which always are present in the hose when the vacuum cleaner housing is moved on the floor, are applied to the vacuum cleaner at a high level and, hence, cause undesirable turning moments on the separation device and on the vacuum cleaner. Thus, the fastening means of the separation device has to be designed to resist these moments and forces. The high position at which the forces are applied also means that the vacuum cleaner has a tendency to tip-over when it is moved sideways.

It is also previously known to use cyclone separators in so-called upright vacuum cleaners. See, for instance, EP-A-489565. Upright vacuum cleaners are, however, designed quite differently than canister cleaners since the nozzle and the vacuum cleaner housing is one single non-separable unit in which also the cyclone separator is placed.

U.S. Pat. No. 5,350,432 describes a canister-type vacuum cleaner having a tube shaft in which the air is circulated during its upward movement within the shaft. The circulating flow is created by means of an element provided with inclined vanes that is placed within the tube shaft. A dirt collecting chamber communicating with the tube shaft by means of a small opening with a cut piece is placed at the upper end of the shaft. The '432 arrangement is complicated and, since the tube shaft is mainly directed upwards, during handling there is a risk that particles which have been sucked into the tube shaft are not lifted up to the opening to the collecting chamber but rather fall backwards within the shaft.

SUMMARY OF THE INVENTION

The present invention provides a simple and effective cyclone separator for a vacuum cleaner of the canister type in which the separator is placed such that the aforementioned drawbacks are minimized or eliminated.

In accordance with the present invention, a vacuum cleaner has a vacuum source communicating with a tube handle. The tube handle is connected to a nozzle by means of a tube shaft. A cyclone separator is provided adjacent the tube shaft.

In further accordance with the present invention, the cyclone separator includes an up-side-down truncated cone which defines a whirl chamber. The cyclone separator has an inlet opening disposed at an upper part of the cyclone separator.

In further accordance with the present invention, the cyclone separator has a central first outlet opening through which partially cleaned air exits the separator and a second outlet opening at a lower part of the whirl chamber communicating with a dust collecting chamber.

In accordance with an embodiment of the invention, the tube shaft includes the cyclone separator. In accordance with another embodiment of the present invention, the cyclone separator is attached to the tube shaft and tube handle.

BRIEF DESCRIPTION OF THE DRAWINGS

These and further features of the invention will be apparent with reference to the following description and drawings, wherein:

FIG. 2 is a vertical section through the separation device;

FIG. 3 is a section in somewhat larger scale on the line III—III in FIG. 2; whereas

DETAILED DESCRIPTION OF THE PREFERRED EMBODIMENTS

Figure 1:
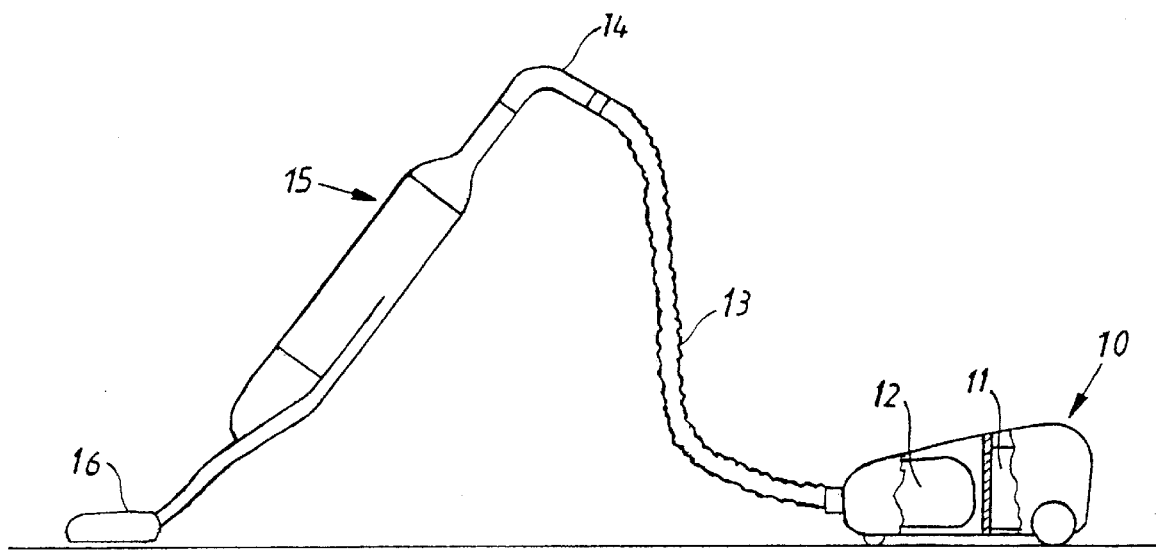
FIG. 1 schematically shows a vacuum cleaner with a separation device according to the invention.

With reference to FIG. 1, a vacuum cleaner according to the present invention has a housing 10 enclosing a motor-fan unit 11 and a dust container 12, preferably a dust bag of air-pervious material. The housing is, by means of a hose 13, connected to a tube handle 14 which is connected to the upper part of a tube shaft 15. The lower part of the tube shaft 15 is connected to a conventional vacuum cleaner nozzle 16.

Figures 2, 3:
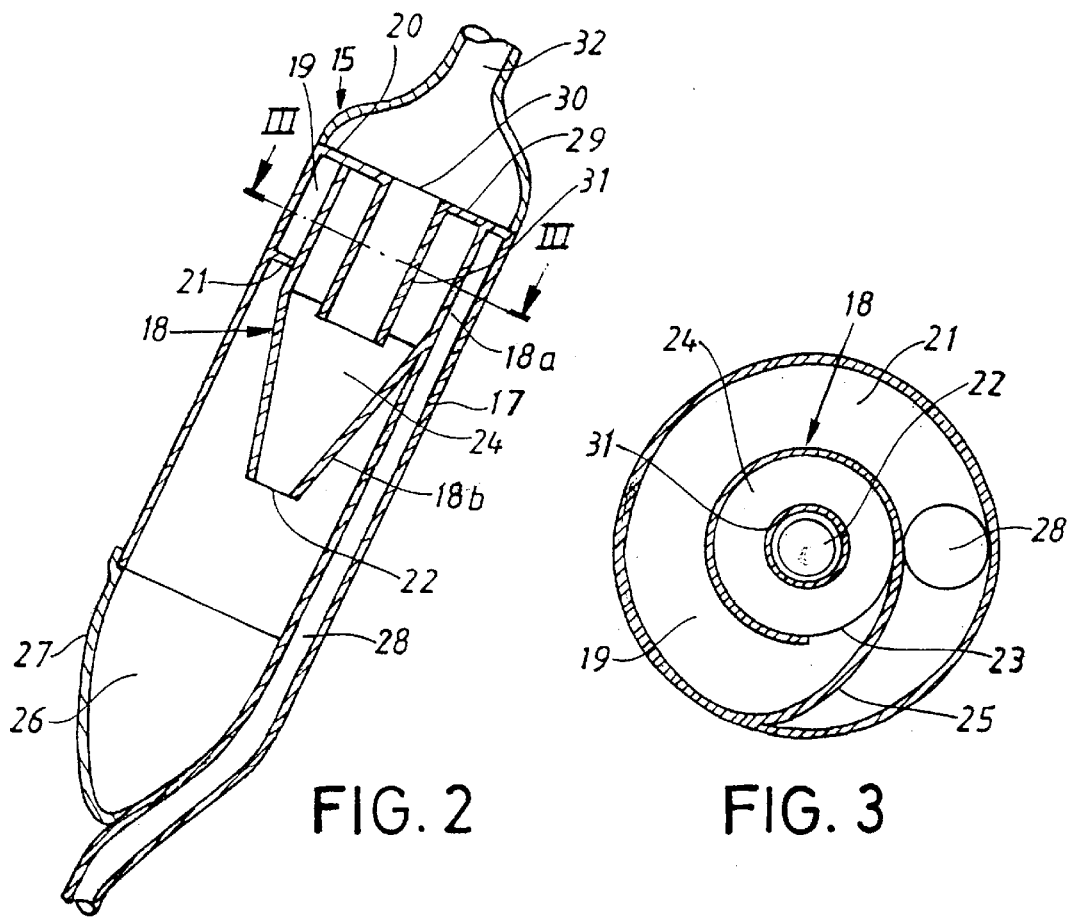

With reference to FIGS. 2 and 3, the tube shaft 15 comprises an outer tube-shaped part 17 and a liner 18. The liner 18 is spaced a distance from the outer part 17 so that a first, mainly circular channel 19 is defined between the liner and the outer part 17. The channel 19 is also limited by an upper and a lower partition wall 20 and 21 respectively.

The liner 18 comprises an upper, mainly cylindrical part 18a and a lower part 18b which is shaped as an up-side-down truncated cone with a downwardly-directed opening 22. The upper part 18a of the liner 18 has an inlet opening 23 to a whirl chamber 24 formed by the liner. The inlet opening 23 is connected to the first channel 19 via a curved wall portion 25, giving the air flowing into the whirl chamber 24 a mainly tangentially-directed movement.

The opening 22 is placed above a collecting chamber 26 which is formed by a bottom part 27 of the tube-shaped part 17. The bottom part 27 can be removed from the tube-shaped part 17 in order to empty the chamber 26.

The first channel 19 is, by means of a second channel 28, connected to the inlet of the tube shaft which is connected to the nozzle 16.

The upper partition wall 20 continues radially inwardly into a wall portion 29 which partially covers the liner 18. The wall portion 29 has a central opening 30 from which a sleeve 31 extends downwardly into the whirl chamber 24.

The opening 30 communicates with an upper connecting tube 32 to which the tube handle 14 is connected.

The device operates in the following way. Dust and dirt-particle laden air is drawn into the nozzle 16 by the fan unit 11 and flows through the channel 28, the channel 19, and through the opening 23 tangentially into the whirl chamber 24. Due to centrifugal force, dust particles are thrown outwardly toward the inner peripheral wall of the liner 18 and, due to gravity, simultaneously fall gradually downwardly through the opening 22 and are collected in the chamber 26. The partially-cleaned air flows out of the whirl chamber 24 via the sleeve 31 then upwardly through the connecting tube 32, the tube handle 14, and the hose 13 into the dust container 12. The finer particles are separated in the dust container 12 before the air flows through the fan unit 11 to atmosphere.

Figure 4:
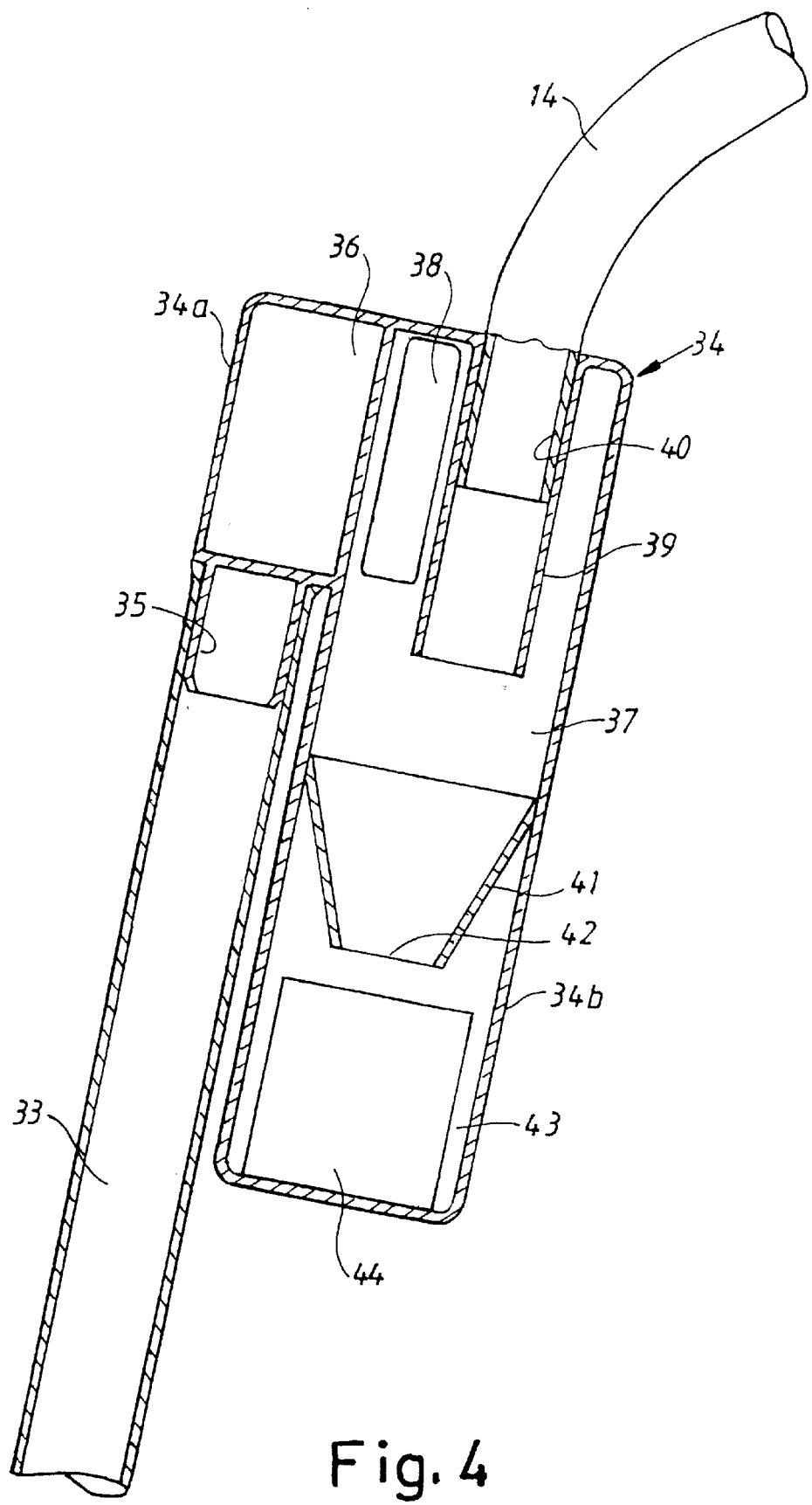
FIG. 4 is a vertical section through an alternative embodiment of a device according to the invention.

In an alternative embodiment shown in FIG. 4, a conventional tube shaft 33 is used. A shell 34 is disposed between the tube shaft 33 and the tube handle 14. The shell 34 is connected to the tube shaft 33 via a first tube coupling 35 and to the tube handle 14 via a second tube coupling 40.

The shell 34 comprises an upper part 34a and a lower part 34b. The upper part 34a encloses a channel 36 that communicates with the first tube coupling 35. The channel 36 also communicates with a whirl chamber 37, which is a part of a cyclone separator, and which is partially limited by a mainly cylindrically-shaped wall part, as illustrated. The cylindrically-shaped wall part has an opening 38 designed and positioned such that the air flows tangentially into the whirl chamber 37 from the channel 36.

The whirl chamber 37 comprises an outlet tube 39 continuing into the second tube coupling 40 to which the tube handle 14 is connected. The outlet tube 39 is placed near, or at, a center of the whirl chamber such that an axis of the outlet tube 39 is mainly parallel to an axis of the whirl chamber 37.

The lower part 34b of the shell 34 encloses a liner 41 which is shaped as an up-side-down truncated cone with a lower opening 42. The whirl chamber 37 communicates with a collecting container 43 via the opening 42. Separated particles fall through the opening 42 and are collected in the container 43. The collecting container 43 has, at its bottom, an emptying opening which is normally closed by a cover 44.

In the alternative embodiment shown in FIG. 4, dust and dirt-particle laden air is drawn in through the tube shaft 33, the channel 36, and the opening 38, and is introduced tangentially into the whirl chamber 37. The air rotates within the whirl chamber 37, causing dirt particles to be thrown outwardly toward the periphery. Simultaneously, the dirt particles fall downwardly through the opening 42 and are collected at the bottom of the container 43. The partially cleaned air flows from the whirl chamber 37 through the outlet tube 39, the second tube coupling 40, and into the tube handle 14. The air continues through the tube handle 14 and the hose 13 to the dust bag 12 arranged within the vacuum cleaner housing 10. Filtered air from the dust bag 12 exits to atmosphere via the fan unit 11 (FIG. 1).

It should be mentioned that the invention also can be used for the type of vacuum cleaners which have been developed during recent years and where the tube handle is a hand-held unit comprising a dust bag as well as the fan unit and which is connected to a tube shaft with a nozzle.

What is claimed is:

1. A vacuum cleaner comprising a vacuum source (11) communicating with a tube handle (14), said tube handle being connected to a nozzle (16) by means of a tube shaft (15, 33), a cyclone separator being disposed between the tube handle (14) and the nozzle (16), said cyclone separator including a whirl chamber (24, 37) which is at least partially defined by a truncated cone (18b, 41), said cyclone separator comprising:

an inlet opening (23, 38), said inlet opening being located at an upper part of the whirl chamber (24, 37);

a central first outlet opening (31, 39) for partially-cleaned air, said first outlet opening communicating with the vacuum source;

a second outlet opening (22, 42) for separated particles disposed at a lower part of the whirl chamber, said second outlet opening communicating with a dust collecting container (26, 43).

2. Vacuum cleaner according to claim 1, wherein the cyclone separator is enclosed in a shell (34) comprising an upper part (34a) with a first tube coupling (35) and a second tube coupling (40), said first tube coupling being connected to the tube shaft (33) and said second tube coupling (40) being connected to the tube handle (14), said upper part (34a) having a channel (36) connecting said first tube coupling (35) with the whirl chamber (37) and a mainly cylindrical wall part which is provided with the inlet opening (38), said inlet opening being arranged such that the air flows mainly tangentially into the whirl chamber, said first outlet opening (39) being provided by a sleeve, said sleeve having an axis which is generally parallel to the axis of the cylindrical wall part, said sleeve being connected to the second tube coupling (40).

3. Vacuum cleaner according to claim 1, wherein the tube shaft (15) comprises the whirl chamber (24), said whirl chamber having a mainly cylindrical wall part (17) provided with said inlet opening (23) through which air flows mainly tangentially into the whirl chamber, the inlet opening (23) communicating with a connecting tube disposed at the lower part of the tube shaft via a channel (19, 28), said first outlet opening (31) being defined by a sleeve, said sleeve having an axis which is generally parallel to an axis of the cylindrical wall part, said sleeve communicating with a tube connection (32) for the tube handle (14), and the tube shaft (15) enclosing said truncated cone (18b).

4. Vacuum cleaner according to claim 1, wherein the tube handle (14) is connected to the vacuum source via a hose (13).

5. Vacuum cleaner according to claim 1, wherein the vacuum source is integrated into the tube handle (14).

6. A cyclone separator attachment for a vacuum cleaner, said separator attachment being removably mounted between a tube shaft and a tube handle, comprising:

a whirl chamber at least partially defined by a truncated cone, said whirl chamber having an inlet opening for particle-laden air, a first, centrally-located outlet opening for partially cleaned air, and a second outlet opening for separated particles, said second outlet opening being disposed at a bottom of said whirl chamber and communicating with a collecting container.

7. A separator attachment according to claim 6, further comprising a shell surrounding said whirl chamber, said shell having first and second tube couplings, a channel fluidly connects said first tube coupling with said whirl chamber via said inlet opening, said inlet opening being arranged such that air flows tangentially into said whirl chamber.

8. A separator attachment according to claim 7, wherein the first outlet opening is defined by a sleeve, said sleeve having an axis which is generally parallel to an axis of the whirl chamber, said sleeve being connected to said second tube coupling.

9. A vacuum cleaner comprising a vacuum source (11) communicating with a tube handle (14), said tube handle being connected to a nozzle (16) via a tube shaft (15), said tube shaft including a cyclone separator, said cyclone separator comprising a truncated cone which at least partially defines a whirl chamber, said cyclone separator comprising:

a cylindrical wall part;

an inlet opening in said cylindrical wall part and located at an upper part of said whirl chamber and through which dirt-laden air enters said whirl chamber;

a central first outlet opening for partially-cleaned air, said first outlet opening communicating with said vacuum source via said tube handle;

a second outlet opening for separated particles disposed at a lower part of the whirl chamber, said second outlet opening communicating with a dust collecting container.

10. A vacuum cleaner according to claim 9, wherein the inlet opening communicates with a connecting tube disposed at the lower part of the tube shaft via a channel.

11. A vacuum cleaner according to claim 10, wherein the first outlet opening is defined by a sleeve, said sleeve having an axis which is generally parallel to an axis of the cylindrical wall part.

12. A vacuum cleaner according to claim 11, wherein the sleeve communicates with a tube connection for the tube handle.

* * * * *

UNITED STATES PATENT AND TRADEMARK OFFICE
CERTIFICATE OF CORRECTION

PATENT NO. : 5,950,274
DATED : September 14, 1999
INVENTOR(S) : Kilstrom

It is certified that error appears in the above-indentified patent and that said Letters Patent is hereby corrected as shown below:

On the Title Page, Section [73], delete "Aktiengesellschaft Electrolux" and insert --Aktiebolaget Electrolux--.

Signed and Sealed this

Thirtieth Day of May, 2000

Attest:

Q. TODD DICKINSON

*Attesting Officer*  *Director of Patents and Trademarks*